Figures 1, 3:
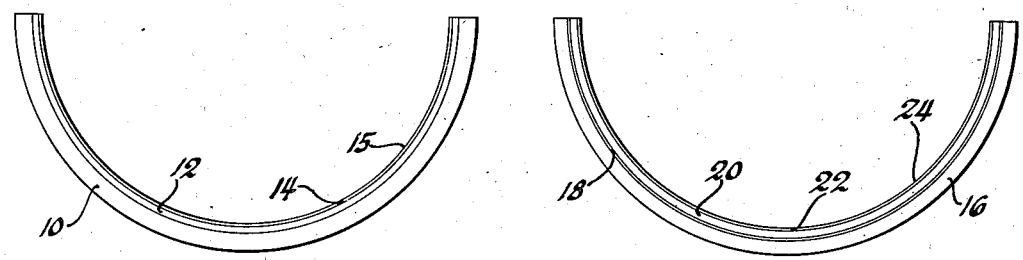

Oct. 16, 1945.  J. D. HOWE  2,386,951

METHOD OF MAKING A BEARING

Filed April 23, 1942

Inventor
John D. Howe
By Blackwood, Spencer & Elliott
Attorneys

Patented Oct. 16, 1945

2,386,951

UNITED STATES PATENT OFFICE 2,386,951

METHOD OF MAKING BEARINGS

John D. Howe, Indianapolis, Ind., assignor to General Motors Corporation, Detroit, Mich., a corporation of Delaware Application April 23, 1942, Serial No. 440,218

5 Claims. (Cl. 29—149.5)

This invention has to do with improvements in bearings, especially bearings used in high speed, heavy duty service, such as in modern aeroplane or Diesel engines. Both silver and copper, particularly oxygen-free copper, are relatively good bearing metals, but suffer the disadvantage that when made into bearings according to conventional methods they are too hard so that particles of grit carried between the shaft and the bearing by the lubricating oil cannot become embedded in them and consequently the shaft is likely to be scored. Furthermore due to the hardness, the frictional properties of the metals are not as good as desired, so that seizing is likely to occur under severe operating conditions.

I have found that silver and copper bearings may be greatly improved by subjecting them to heat treatment at sufficient temperatures and for a sufficient length of time to greatly soften the metals, thereby markedly improving both their embeddability and their frictional properties.

Substantial improvement may be obtained by subjecting the bearing to temperatures as low as 600° F. for a relatively short period of time, for example, one hour. Greater softness and therefore greater improvement may be obtained by employing higher temperatures as hereinafter set forth. It will be appreciated that the time of treatment is likewise subject to considerable variation; thus longer heat treatment at one temperature may produce substantially as good results as shorter heat treatment at a somewhat higher temperature.

My invention has been used in the manufacture of copper bearings in which the copper bearing metal is bonded directly to the steel back. It has also been used to a large extent in the manufacture of silver bearings for aircraft engines in which the silver is bonded to the steel back by means of an intervening layer of copper.

I have found that silver bearings may be further greatly improved by employing nickel as the intermediate metal instead of copper. When such bearings are heat treated as above described not only is the bond between the metals improved to a greater degree than where the intermediate layer is of copper but the use of nickel permits carrying the heat treatment to higher temperatures, i. e., to temperatures approaching the melting point of silver with the result that the silver becomes softer and therefore a better bearing material.

The scope and advantages of the invention will be made clear in the following description.

In the drawing:

Figure 1 indicates diagrammatically one example of a copper bearing to which my invention may be applied.

Figures 2, 4:
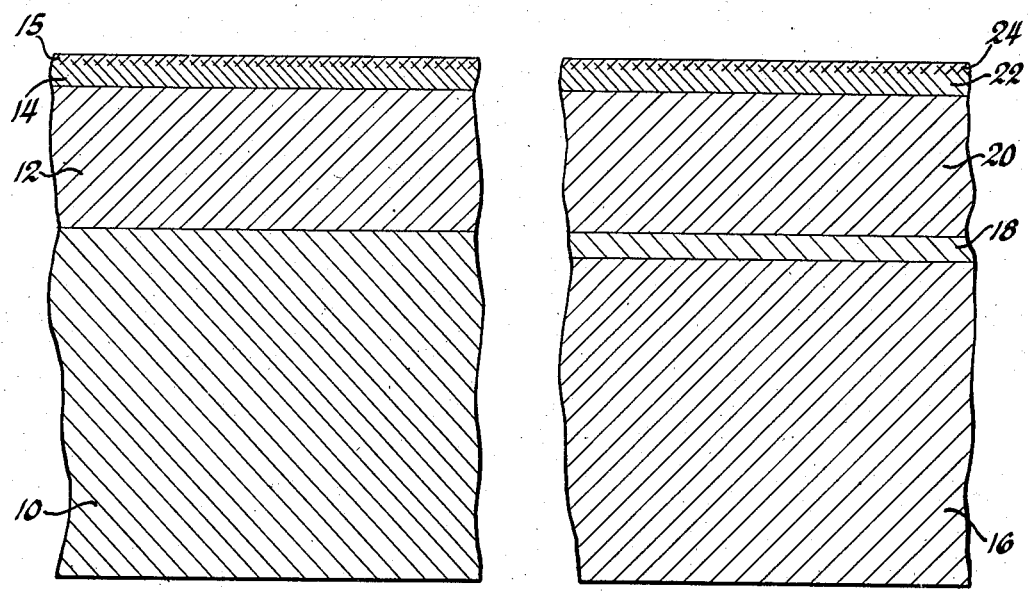

Figure 2 is an enlarged section through the bearing.

Figure 3 indicates a type of silver bearing to which my invention has been successfully applied.

Figure 4 is an enlarged section through the bearing of Figure 3.

The bearing illustrated in Figures 1 and 2 consists of a back 10 of steel or other suitable strong load supporting material to which is bonded a layer 12 of copper. The copper, preferably free of oxygen, may be bonded to the steel by casting it on a steel back under a non-oxidizing atmosphere or, similarly, by rolling or pressing superposed sheets of copper and steel together under a protecting atmosphere at sufficiently high temperatures to secure bonding. An objection to the casting process is that at casting temperature iron alloys with copper and adversely affects its frictional properties. A further objection to the processes mentioned is the fact that the grain structure of the copper, particularly where cast, is relatively large and the beneficial effects of heat treatment are much less than in the case of plated copper, next to be described.

I prefer to apply the copper to the steel strip by electroplating. With ordinary copper plating it is difficult to secure deposits of a thickness greater than .010" without roughness or treeing. I prefer, particularly where thicker deposits of copper are desired, to use the improved plating bath recently invented by Mr. Carroll F. Matthews of Indianapolis, Indiana. The bath is made up of copper sulphate, sulphuric acid and animal glue in substantially conventional proportions, the small amount of glue being added to control grain growth. To this bath is added about 20 m. l. per gallon of Tergitol=08, a well-known wetting agent. In the use of this bath the steel shell, after very thorough cleaning, is plated in a conventional copper cyanide striking bath and is then plated to the desired thickness in the Matthews bath, employing current densities up to 300 amperes per square foot. Plating is accomplished at the relatively rapid rate of .003" per hour. The copper plating may vary in thickness from as little as about .002" to .100" or more as desired. The copper thus plated is fine grained, smooth and free from treeing.

I have found it best to machine bearings to finished dimensions before heat treating them because a certain amount of hardening results from working of the metal. However, if desired, the bearings may be heat treated when in the semi-finished state. Whenever done, heat treatment reveals bearings which are defective because of poor bond by causing the metal to blister over the areas where the bond is poor. By heat treating prior to complete machining defective bearings may be discarded before all the precision machine work has been expended on them.

When the bearings are in semi-finished state it is not necessary to use a non-oxidizing atmosphere during heat treatment but the use of such an atmosphere is essential in case machining has been completed as copper oxide is not a desirable bearing material.

Bearings made as described may be heat treated at temperatures as low as approximately 600° F. but for best results it is desirable to use higher temperatures. Temperatures up to the neighborhood of the melting point of copper (1981° F.) may be employed. 1800° F. is probably about the highest temperature to which heat treatment may be carried without getting an undesirable amount of diffusion of the iron into the copper. The heat treatment should be continued for approximately one hour.

The heat treatment substantially increases the softness of the copper bearing metal. Hardnesses on the order of 20-40 Rockwell 15W may be readily obtained with corresponding increase in imbeddability and improvement in frictional properties. The heat treatment also substantially improves the bond between the copper and the steel, and, of course, as the melting point is approached the bond becomes closer to a fusion bond such as is obtained by casting. The heat treatment also serves as a check on the quality of the bond as previously explained.

If desired, there may be applied to the heat treated bearing, preferably by electroplating, a thin layer 14 of very soft metal, preferably lead, to further improve the frictional properties of the bearing. In order to resist the corroding effects of acid lubricating oils the lead is preferably treated with material such as tin or indium as indicated at 15. This may be done by electrodepositing a thin film of tin or indium on the lead and thereafter heat treating it at relatively low temperatures, i. e., on the order of 365° F., to cause diffusion of the metals. The layer of lead may vary in thickness from approximately .0005" to .003". For heavy loads thicknesses around the lower limit are to be preferred as with the greater thicknesses there is a tendency for the lead to be squeezed out of the bearing. The amount of tin or indium applied to the lead may vary from .0001" to .0003", the larger amounts being required with the thicker layers of lead. Tin-impregnated lead-coated bearings are described and claimed in the prior application of George A. Zink, Serial No. 376,039, filed January 27, 1941, and reference is made to that application for details of the process of manufacture.

With the lead coating applied, it initially forms the entire bearing surface but in service it is found that it is sometimes worn through in spots so that the copper becomes a part of the bearing surface. In general, the underlying metal serves as a secondary bearing surface backing up the lead and enabling it to resist compression loads and providing, when exposed, a relatively good bearing surface. Whether the bearing surface is wholly of copper or partly of copper and partly of lead or wholly of lead it is desirable that it be sufficiently soft for a sufficient depth to embed particles of grit or dirt. While lead has the requisite softness, the layer is so thin that it cannot embed the larger particles. Hence the very great desirability of increasing the softness of the underlying metal by heat treatment.

In Figures 3 and 4 there is disclosed a type of silver bearing to which my invention has been successfully applied. One form of this bearing and its method of manufacture are described and claimed in the copending application of George A. Zink and Carroll F. Matthews, Serial No. 350,046, filed August 2, 1940. Reference is made to that application for details of the bearing and its manufacture, particularly the various steps employed in cleaning the bearing both before and after plating, the composition of the baths, and the plating procedure. Most of this cleaning and plating procedure is also applicable to the manufacture of the copper bearing just described.

16 indicates the back which may be of steel or other suitable load supporting material. The back, in the case of the silver bearing as well as in the case of the copper bearing just described, may be of any desired thickness depending upon the service to which it is to be put. In some cases it may be desirable to employ a somewhat flexible back but in the case of high-speed heavy-duty bearings such as are used in aircraft engines it is preferable to use backs so thick as to provide a substantially rigid supporting structure.

The steel back is first thoroughly cleaned. Thereafter it may be electroplated with copper as disclosed in said application but I have found is preferable to employ nickel plating. Conventional nickel chloride or sulphate plating baths may be employed. It may be found desirable to add a suitable brightener to the bath and I have found the wetting agent, Duponol, satisfactory for the purpose. The thickness of the copper or nickel layers is not critical. In the case of copper thicknesses of from .00005" to .0015" have been employed. In the case of nickel I prefer to employ thicknesses of from .0001" to .0005". The layer of copper or nickel is indicated at 18 on the drawing.

Next the plated bearing is thoroughly cleaned as disclosed in the said Zink and Matthews application to provide a chemically active surface to receive the silver. This is preferably applied as disclosed in the said application by first plating the bearing for a short time in a striking solution, then transferring it to the bright silver plating bath and continuing the plating until the desired thickness is obtained. The anode is preferably rotated during plating to obtain a uniform deposit and best results will be obtained by further agitating the solution. The silver so plated is characterized by extremely fine grain structure.

In some instances it may be satisfactory to cast the silver on the plated back, for example, by centrifugal casting preferably under a non-oxidizing atmosphere; or to unite the silver with the steel back by hot rolling a sheet of silver superposed on a sheet of steel under a protecting atmosphere. However, at casting temperatures copper alloys with silver impairing the bond. The fine grain structure obtained by plating is also much to be preferred as heat treatment is more effective in producing the desired results when applied to the plated metal.

The bearing is next machined, preferably to finished dimensions, prior to heat treatment. The heat treatment should be carried out under a non-oxidizing atmosphere. As in the case of the copper bearing, heat treatment may be given to the bearing in the semi-finished state if preferred, and in such case no protecting atmosphere is necessary.

Beneficial results may be obtained employing temperatures as low as on the order of 600° F. but much better results are obtained with higher temperatures. With copper as the intermediate layer temperatures as high as 1050° F. should not be used as at this temperature there is considerable diffusion of copper into the silver; this likewise impairing the bond between the two metals.

The preferred heat treatment temperature, whether copper or nickel is the intermediate metal, is around 1000° F., and the treatment is preferably continued for about one hour. The effect is to substantially increase the softness of the silver; hardnesses in the range 30-80 Rockwell 15W are readily obtained.

In the case of the intermediate layer of copper there is, in addition, some improvement of the bond between the copper and the steel. With nickel beneath the silver, the bond between the nickel and the steel as well as that between the nickel and the copper is substantially improved.

While nickel as originally plated on the steel back is frequently but poorly bonded to it, the result of heat treatment is to secure a more consistent and much better bonding of the silver to the back than is possible with copper. Nickel offers the further advantage that heat treatment may be carried to much higher temperatures, approaching the melting point of silver (1761° F.), with corresponding improvement in the bond and further desirable softening of the silver. Desirable results have been obtained by heat treating such bearings to around 1400° F. Thus by heat treating at this temperature successful bearings have been produced having bonds several times as strong as generally obtained with copper. The effect on the silver is to make it substantially as soft as babbitt.

The bearings above described may, if desired, be provided with a layer of soft metal, preferably lead, as indicated at 22, the lead preferably being treated with tin or indium, as indicated at 24, to resist corrosion, just as in the case of the copper bearings. Reference is made to the Zink application above referred to for full details of the process of applying and treating the lead.

Both silver and copper bearings made as disclosed herein have performed very successfully under the most severe operating conditions encountered in modern high speed heavy duty aircraft and Diesel engines.

I claim:

1. The method of making bearings which consists in applying to a ferrous metal back a layer of metal of the group consisting of copper and nickel, applying to the said layer a layer of a metal of the group consisting of silver and copper, machining the bearing to substantially finished dimensions, and heat treating the bearing at temperatures on the order of 600° F. and upward but below the melting point of the metal for approximately one hour to improve the bond between the layers and to soften the said second metal layer and improve its embeddability and frictional properties.

2. The method of making bearings which consists in electroplating on a steel back a layer of metal of the group consisting of nickel and copper, electroplating a layer of silver on the layer of nickel or copper, and heat treating the lined back at temperatures on the order of 1000° F. or upward but below the melting point of silver for approximately one hour to improve the bonding of the silver to the steel back and soften the silver to improve its frictional properties and embeddability.

3. The method of making bearings which consists in bonding a layer of a metal of the group consisting of copper and silver to a strong metal supporting back, machining the bearing to substantially finished dimensions, and thereafter heat treating the bearing at temperatures on the order of 600° F. or upward but below the melting point of the metal for approximately one hour in a non-oxidizing atmosphere to soften the said metal layer so as to improve its embeddability and frictional properties and at the same time improve its bond to the back.

4. The method of making bearings which consists in bonding to a steel back a layer of metal of the class consisting of copper and nickel and bonding thereto a layer of metal of the class consisting of copper and silver, machining the bearing to substantially finished dimensions and thereafter heat treating the bearing to temperatures on the order of 600° F. and upward but below the melting point of the copper or silver for a sufficient length of time to reduce the hardness of the silver or copper to values not in excess of approximately 80 Rockwell 15W to improve its frictional properties and embeddability as well as improve the bond.

5. The method of making bearings which consists in bonding to a steel back a layer of metal of the class consisting of copper and nickel and bonding thereto a layer of metal of the class consisting of copper and silver, machining the bearing to substantially finished dimensions and thereafter heat treating the bearing to temperatures on the order of 1000° F. and upward but below the melting point of the copper or silver for approximately one hour to improve the bond as well as soften the copper or silver to improve its frictional properties and embeddability.

JOHN D. HOWE.